United States Patent [19]

Rogant

[11] Patent Number: 4,967,707
[45] Date of Patent: Nov. 6, 1990

[54] ROTARY ENGINE

[76] Inventor: H. R. Rogant, Rte. 9, Box 341, Cherokee Trace, Cumming, Ga. 30130

[21] Appl. No.: 219,045

[22] Filed: Jul. 14, 1988

[51] Int. Cl.⁵ .............................................. F02B 53/00
[52] U.S. Cl. .................... 123/228; 418/248
[58] Field of Search ............... 123/228, 248; 418/123, 418/124, 248

[56] References Cited

U.S. PATENT DOCUMENTS

| | | | |
|---|---|---|---|
| 892,201 | 6/1908 | Welsh et al. | 123/228 X |
| 1,219,829 | 3/1917 | Marion | 123/248 |
| 1,307,282 | 6/1919 | Ward | 123/228 X |
| 1,338,039 | 4/1920 | Porter | 123/228 |
| 1,738,320 | 12/1929 | Rothenberger | 123/201 |
| 1,968,729 | 7/1934 | Winsor et al. | 123/228 X |
| 2,175,265 | 10/1939 | Johnson | 123/228 |
| 2,280,742 | 4/1942 | Bowers . | |
| 2,744,505 | 5/1956 | Sherman . | |
| 2,821,176 | 1/1958 | Koser et al. | 123/248 |
| 3,164,139 | 1/1965 | Appleton . | |
| 3,251,348 | 5/1966 | Unruh . | |
| 3,478,727 | 11/1969 | Marcoux | 123/228 |
| 3,771,500 | 11/1973 | Shakiba . | |
| 3,872,839 | 3/1975 | Russell et al. . | |

FOREIGN PATENT DOCUMENTS 3433716  5/1985  Fed. Rep. of Germany ...... 123/228

Primary Examiner—Michael Koczo
Attorney, Agent, or Firm—Watts, Hoffmann, Fisher & Heinke Co.

[57] ABSTRACT

A rotary internal combustion engine comprising an external rotor housing with a wall defining an internal cylindrical chamber, an inlet for supplying compression fluid, an ignition assembly for igniting fluid within the chamber, a transfer assembly for transmitting fluid to the chamber, and an outlet exhausting combustion exhaust from the chamber. A cylindrical rotor element is also mounted within the chamber on a central rotating shaft, and includes an engagement surface with lobes extending therefrom. A seal controls the flow of fluid between the rotor element and housing wall. Rotatable pawls are mounted in the housing wall, each with an engagement surface, and movable between a position contiguous with the wall and a position wherein projecting from the wall into said chamber to continuously engage the rotor element. Rotation of the rotor element moves the pawls in continuous engagement with lobes between positions to define operating chambers located intermediate the housing wall and rotor element.

1 Claim, 2 Drawing Sheets

ROTARY ENGINE

TECHNICAL FIELD

This invention relates to an internal combustion engine and more specifically to a rotary internal combustion engine.

BACKGROUND ART

Rotary internal combustion engines have been available for many years. One of these early engines is disclosed, for example, in U.S. Pat. No. 1,307,282 wherein a rotary engine with a lobed rotor is housed within a casing having a fluid transmission device activated by the rotation of the rotor. U.S. Pat. No. 2,175,265 also discloses a rotary engine with a lobed rotor operating within a housing to drive a central rotating shaft. While such engines may have performed satisfactorily, they also required a number of parts, which made them costly to operate, maintain and to produce.

Disclosure of the Invention

The present invention provides an improved rotary internal combustion engine requiring a limited number of parts and using the inherent inertial advantage of a flywheel, to obtain an engine which is inexpensive to operate, maintain and to produce. The engine comprises an external rotor housing having a wall defining an internal chamber, an inlet supplying compression fluid to the chamber, an ignition assembly for igniting compression fluid within the chamber, a fluid transmitting assembly for transporting fluid within the chamber, and an outlet exhausting combustion exhaust from said chamber. A rotor element is preferably mounted within the chamber on a central rotating shaft. The rotor element includes a center axis aligned with a center axis of the rotating shaft, and an engagement surface with first and second lobes extending therefrom. Step surfaces interconnect the engagement surface where the radial dimension of the lobe is larger than the radial dimension of the adjacent engagement surface.

Seals are additionally provided for controlling the flow of fluid within the chamber. The seals are preferably mounted in a seal chamber within the rotor element for engagement with the housing wall. The seal chamber is preferably in communication with the operating chamber, such that rotation of the rotor element during engine operation forces the seals in a direction radially away from the shaft into engagement with the wall under combustion force, to provide an effective seal between the wall and rotor element.

Another feature of the preferred embodiment includes opposed elongate pawls, including an inlet pawl and a combustion pawl, which are rotatably mounted within the housing wall for movement between positions. Each pawl is rotatable about a pivot into and out of a cutout located within the housing wall, and includes an engagement surface for engaging the rotor element. During operation of the engine the pawls are moved between a first position relationship wherein the wall and pawl engagement surfaces are contiguous during rotation of the pawl past the lobe portion, and a second position relationship wherein the pawls project into the chamber for continuous engagement with the rotor element during rotation of the pawl past the step surface. The pawls are in continuous engagement with the rotor element, moving between contiguous and projecting relationships with the rotor element to alternately define operating chambers located intermediate the housing wall and rotor element. The pawls are continuously engaged with the rotor element under the bias of a compression spring engaged with the pawl via the exterior of the housing, through the housing wall and into the cutout. The operating chambers preferably comprise an inlet chamber, a compression chamber, a combustion chamber and an exhaust chamber, where the four stages of operation of internal combustion are performed.

In the preferred embodiment, a variety of operations are performed by the combustion pawl. The pawl seals the assembly transmitting fluid within the chamber, to limit compression fluid flow to the combustion chamber when the combustion pawl is in projecting relationship with the wall. A canty is provided in the combustion pawl, which in part defines the combustion chamber when in projecting relationship with the wall, and communicates with the fluid transmitting assembly when the combustion pawl is in contiguous relationship with the wall.

In accordance with still another feature of the preferred embodiment, the fluid transportation assembly, for transmitting fluid between adjacent compression and combustion chambers, comprises a manifold outlet to the combustion chamber transferring fluid into the chamber and a manifold inlet for receiving fluid from the compression chamber. One way valves are located outside the external housing, each in communication with a manifold inlet and a manifold outlet, for regulating the flow of fluid to and from the chambers, respectively. A transfer manifold communicates with the one way valves, and manifold inlet and outlet, for reserving fluid to be provided to or received from the chambers.

During operation of the rotary combustion engine of the present invention the rotor element rotates in a counter clockwise direction whereupon combustion fluid is provided via an inlet to the inlet operating chamber. As rotation of the rotor element continues, the intake chamber becomes a smaller compression operating chamber wherein the fluid is compressed, until the step surface rotates past the manifold inlet, whereupon pressurized fluid exits through the manifold inlet and enters the transfer manifold via the one-way valve. As the transfer manifold transports less cubic feet per minute of fluid than the compression chamber, fluid is released to the manifold outlet and the combustion pawl canty via the associated one-way valve. As the step surface rotates past the combustion pawl, the pawl seals the manifold outlet to limit the flow of additional fluid to the combustion chamber.

Ignition of the fluid within the combustion chamber is provided by an ignition assembly having a spark plug mounted in the housing wall. The force of fluid combustion against the combustion pawl groove and in a direction toward the rotor element step surface, continues rotation of the rotor element and the rotating shaft.

As rotation of the element and shaft continue, the step surface passes the exhaust outlet and forces combustion exhaust to exit the operating chamber. Once movement of the rotor element is continued, thereby diminishing the exhaust chamber, the element and step surface are positioned to repeat the operation.

The design of the present invention uses the full mechanical lever advantage of the rotor element to directly impart maximum torque to the rotating shaft. The two opposed lobes of the rotor element operate to perform two complete combustion cycles per revolution of the rotor element. By coupling two of the engines described above in 90° opposition, the advantages, effect and performance of an eight-cylinder combustion engine can be achieved.

The preferred embodiment of the engine of the present invention can be manufactured of metal or ceramic materials, and requires a limited number of parts, thus resulting in inexpensive and easy manufacture and assembly. Further, since only a small number of moving parts are required for operation, the engine is able to generate added torque using less fuel.

Other features and advantages of the present invention will become apparent from the following detailed description of a preferred embodiment made with reference to the accompanying drawings forming part of the specification.

Best Mode for Carrying Out the Invention

Figure 1:
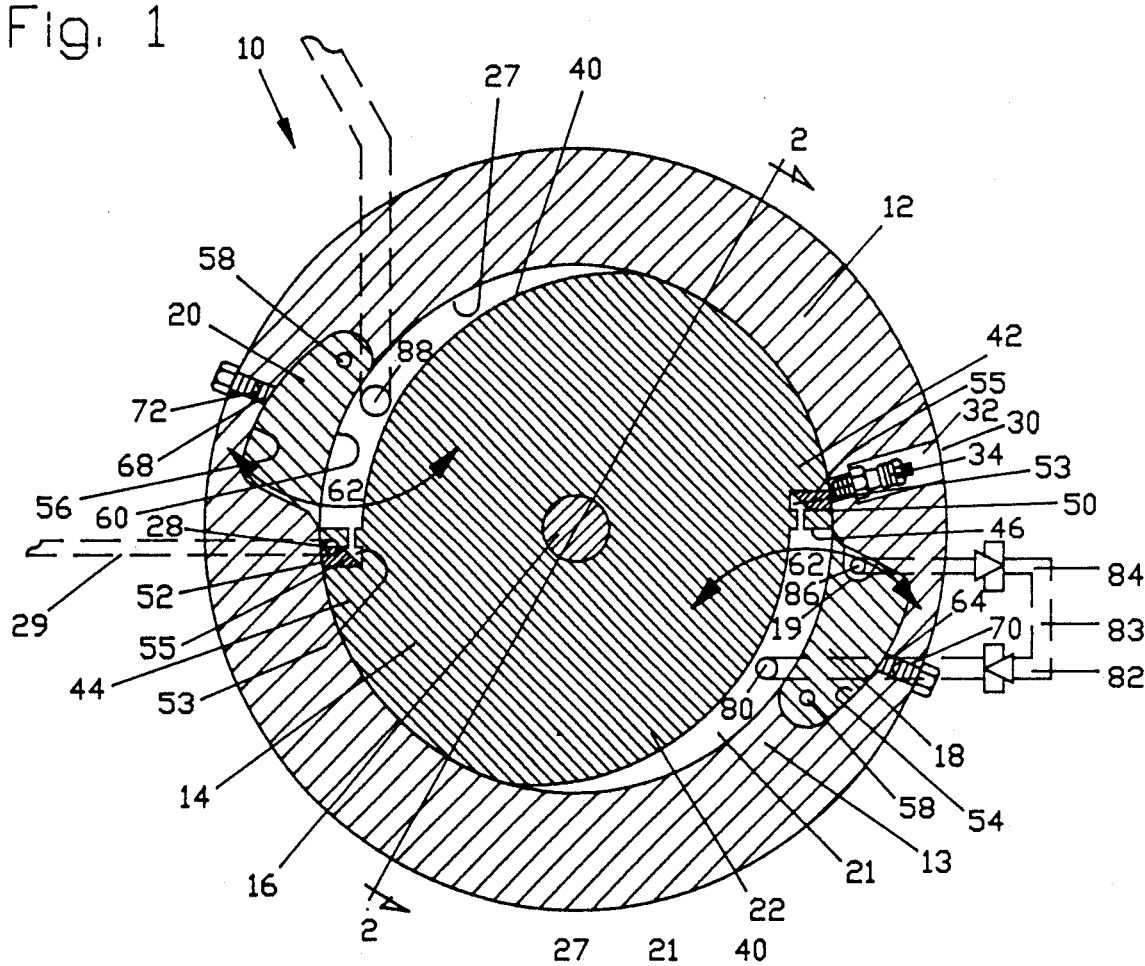
FIG. 1 is a partial cross-sectional view of a rotary internal combustion engine constructed in accordance with the present invention.

A rotary internal combustion engine 10 constructed in accordance with the present invention is illustrated in FIG. 1 of the drawings as comprising an external rotor housing 12, a rotor element 14, a central shaft 16 secured to the rotor element, and combustion and inlet pawls 18, 20 rotatably mounted within the housing for engagement with the rotor element to form operating chambers wherein the four stages of the combustion operation are performed, including an inlet chamber, a compression chamber, a combustion chamber and an exhaust chamber.

The rotor housing 12, formed of metal or ceramic, is of a generally cylindrical configuration for housing the rotor element 14, and includes a wall 13 defining an internal chamber 21 having an engagement surface 27 for engagement with the rotor element. The wall includes an outer annular portion 22 and opposite side portions 24, 26 adjacent the outer portion. The housing further includes an inlet 28 supplying compression fluid to the chamber, an ignition assembly 30 for igniting compression fluid within the chamber, a fluid transmitting assembly 36 for transporting fluid within the chamber, and an outlet 88 for exhausting combustion exhaust from the chamber.

The rotor element 14 has a generally cylindrical configuration formed of metal or ceramic, and as shown in FIG. 1, is mounted within the chamber 21 in fixed engagement with the central rotating shaft 16. The shaft supports the rotor element within the chamber and is rotated together with the rotor element during engine operation. Bearings 97 are provided within the housing wall 13 for rotatable bearing engagement between the housing 12 and shaft 16. A center axis A of the rotor element is aligned with a center axis of the rotating shaft, and an engagement surface 40 of the rotor element is spaced radially from the center axes with opposed lobes 42, 44 extending radially from the surface 40. Step surfaces 46, 48 interconnect the engagement surface where the radial dimension of the respective lobe 42, 44 is larger than the radial dimension of the adjacent portion of the engagement surface. Opposed spaces are formed between the rotor element 14 and the housing wall 13 in the form of half-crescents. The inlet chamber, the compression chamber, the combustion chamber and the exhaust chamber are at different times formed by portions of the half-crescent spaces.

Figure 2:
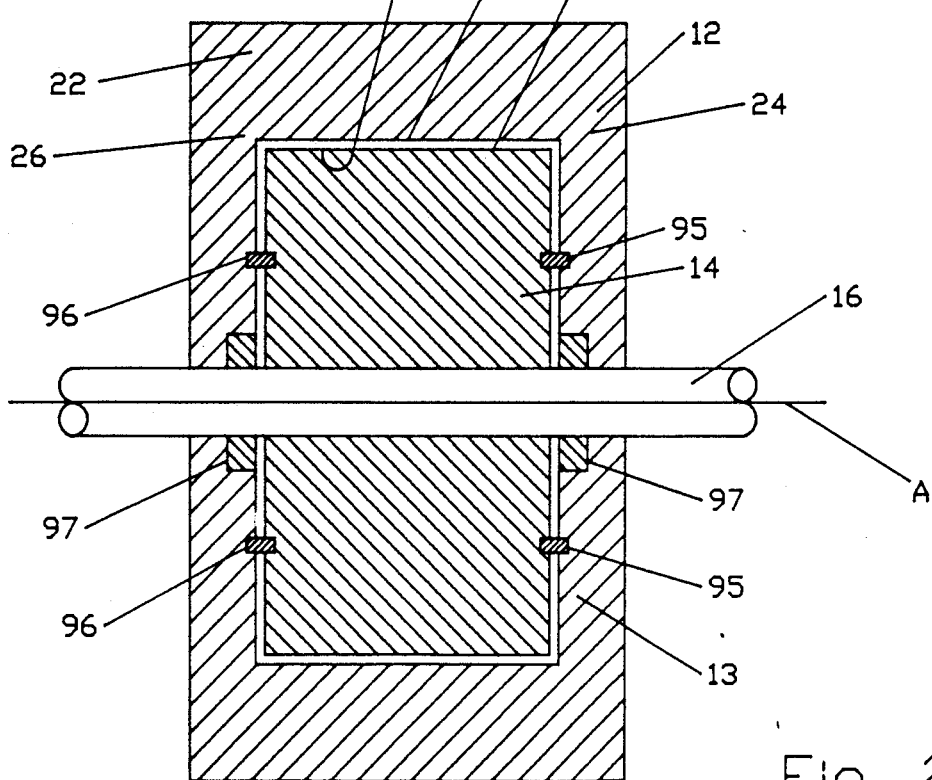
FIG. 2 is a block diagram of the cross-sectional view of the plane indicated by the line 2—2 of FIG. 1.

Combustion seals 50, 52 and ring seals 95, 96 are provided to control fluid flow within the chamber. As shown in FIG. 2, the ring seals are supported intermediate the rotor housing wall 13 and the opposed side portions 24, 26, to control the flow of combustion and lubrication fluids between the rotor element and the housing wall.

The combustion seals 50, 52 are also provided at locations intermediate the rotor element and housing wall at locations radially spaced from the shaft for controlling the flow of combustion fluid. The seals are movably mounted within seal chambers 53, and comprise seal elements 55 supported within the rotor element adjacent the associated step surface 46, 48 for sealing engagement with the wall engagement surface 27. As illustrated, the seal chambers 53 are in communication with the combustion chamber so that the combustion force and rotation of the rotor element drive the elements radially away from the shaft and into sealing engagement with the wall engagement surface 27 to provide an effective seal. The seal elements 55 are manufactured of Teflon TM or other flexible, heat resistant material, which is movable for compression sealing engagement with the wall.

As further shown in FIG. 1, the combustion pawl 18 and inlet pawl 20 are mounted, respectively, within cutouts 54, 56 in the housing wall 13. Each pawl is rotatable about a pivot 58, as indicated by the arrows in FIG. 1, for movement between positions, and has a concave surface 60 for complementary engagement with the engagement surface 40 of the rotor element. When the engine is operated and the rotor element is rotated, the pawls move between a first position relationship wherein each pawl 18, 20 is contiguous with the wall engagement surface 27 as it moves past, and engages the lobes 42, 44. Movement to a second position relationship results when the pawl tip 62 is rotated past the step surface 46, 48 and the pawls 18, 20 then project into the chamber 21 and continuously engage the engagement surface 40 adjacent the step surfaces where the radius is smaller than the radius of the lobe. The pawls are biased into engagement with the rotor element by compression springs 64, 68 engaged with each of the pawls. The compression springs are captured within the housing wall 13 by threaded fasteners or other conventional fasteners, in spring chambers 70, 72 which extend through the wall engagement surface 27 and into their respective cutouts 54, 56.

The compression springs bias the rotatable pawls into continuous engagement with the rotor element between contiguous and projecting relationships with the rotor element. Variable operating chambers are thus formed during rotation of the rotor element at locations intermediate the wall engagement surface 27 and the rotor engagement surface 40. The chambers are largest immediately prior to movement of the pawl tip 62 past the step surface, as illustrated in FIG. 1. The operating chambers formed during rotation are provided for performance of the four stages of the combustion operation, and comprise an inlet chamber, a compression chamber, a combustion chamber and an exhaust chamber. Each of the respective operations is performed during rotation of the rotor element through these stages as indicated in FIG. 1.

In the illustrated embodiment, the single combustion pawl performs a variety of operations. The pawl 18 seals the fluid transmitting assembly 36 to limit compression fluid flow to the combustion chamber when the pawl projects from the wall. A canty 19 in the pawl 18 in part defines the combustion chamber when the pawl is in projecting relationship with the wall, and communicates with the fluid transmitting assembly 36 when the combustion pawl is in contiguous relationship with the wall.

During operation of the engine the rotor element rotates in the counter clockwise direction in FIG. 1, whereupon combustion fluid is provided by the inlet 28 to the inlet operating chamber to begin the intake stage operation. During intake, the intake operating chamber is supplied with fluid by the combustion fluid inlet 28 which is in communication with a supply of fluid (not illustrated) for providing fluid to the engine via an inlet tube 29.

Continuous rotation of the rotor element reduces the intake operating chamber, moving and compressing the fluid into the compression stage and compression operating chamber. The fluid transmitting assembly 36 is provided for transporting compressed fluid between the adjacent compression and combustion operating chambers. The assembly includes a manifold inlet 80 for receiving fluid from the compression chamber. A one way valve 82 regulates the flow of fluid between the chamber by preventing the back flow of fluid to the compression chamber. A transfer manifold 83, located outside the wall 13, receives the pressurized fluid for communication past a one way valve 84. The one way valve 84 provides fluid to the combustion chamber via a manifold outlet 86. Alternatively, a by-pass tube (not illustrated) may be used to directly connect the manifold inlet 80 and the manifold outlet 86, without the use of intermediate one way valves.

Once the step surface is rotated past the manifold inlet 80, pressurized fluid exits through the manifold inlet 80 to transfer manifold 83 via the one-way valve 82. Since the transfer manifold 83 transports less cubic feet per minute of fluid than the compression chamber, fluid is released from the manifold 83 to the canty 19 via the manifold outlet 86 as the step surface continues to rotate. Once the tip 62 passes the step surface, the pawl 18 projects into the chamber 21, seals the outlet 86 from releasing further fluid to the combustion chamber. Thus a valve is formed by the side of the combustion pawl 18 and the wall of the cutout accommodating combustion pawl 18 and the manifold outlet 86.

Ignition of the fluid within the combustion chamber is provided shortly thereafter when the step surface rotates past the ignition assembly 30. The assembly 30 comprises a spark plug chamber 32 in the housing wall supporting a spark plug 34 for sparking the fluid within the combustion chamber to ignition. The force of combustion within the combustion chamber is against the canty 19 of the combustion pawl 18, and acts upon the rotor element step surface to continue rotation of the rotor element.

Rotation of the element is thus continued to the exhaust stage wherein the step surface passes an exhaust outlet 88 for exhausting combustion exhaust gases from the chamber via an exhaust tube 90 in the wall 13. When movement of the rotor element is continued to reduce the exhaust chamber, the step surface is rotated past the inlet 28 and is thus positioned to perform the intake operation and continue the operation cycle.

Figure 3:
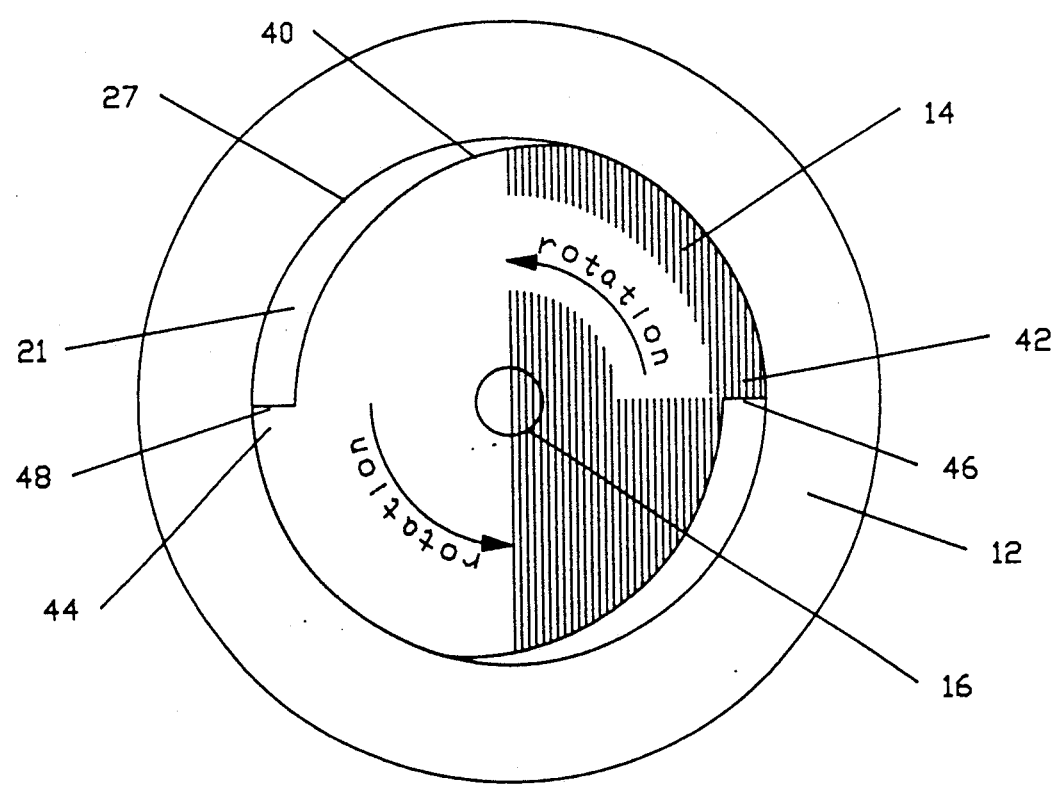
FIG. 3 is a block diagram showing the stages of operation of the rotary internal combustion engine of the present invention.

Rotation of the rotor element and continuous engagement of the pawls 18, 20 and opposed lobes 42, 44 of the rotor element operate to perform two combustion cycles per revolution of the rotor element, as indicated by the solid and shaded portions of the rotor element of FIG. 3. The design of the rotor element of the present invention takes full advantage of the pawl operation within the housing, and is able to obtain the inertial advantages of a flywheel. Coupling two of the engines in 90° opposition, obtains the further advantage and performance of an eight-cylinder combustion engine. Since operation of the engine requires only a limited number of operating parts, it is thus able to generate additional torque with less fuel consumption.

While a preferred embodiment of the invention has been disclosed in detail, the present invention is not to be considered limited to the precise constructions disclosed here. Various adaptations, modifications and uses of the invention may occur to those skilled in the art to which the invention relates and the intention is to cover all such adaptations, modifications and uses falling within the spirit or scope of the appended claims.

I claim:

1. A rotary internal combustion engine comprising:
   (a) an external rotor housing having a wall defining an internal chamber, a stationary inlet supplying compression fluid to said internal chamber, stationary means mounted in said wall for igniting compression fluid within said internal chamber, means for transporting compression fluid to a combustion chamber formed within said internal chamber from a compression chamber formed within said internal chamber, and a stationary outlet exhausting combustion exhaust from said chamber, said means for transporting compression fluid comprising an inlet for receiving fluid from said compression chamber and an outlet for transferring compression fluid into said combustion chamber, and a transfer conduit in communication with said inlet and said outlet to transfer compression fluid therebetween;
   (b) a rotor element mounted within said chamber and having an engagement surface with first and second lobes extending therefrom;
   (c) said internal chamber comprising two spaces, each in the form of a half-crescent, said spaces located opposite one another and each having an inner wall formed by said rotor element and an outer wall formed by said housing wall;
   (d) seal means supported within the rotor element for engagement with the housing wall for controlling the flow of compression fluid and combustion gasses between the rotor element and housing wall;
   (e) a central rotating shaft supporting said rotor element within said chamber;
   (f) an inlet pawl and a combustion pawl rotatably mounted in said housing wall, each having an engagement surface for engaging said rotor element and being movable between a first position wherein said engagement surface is contiguous with said wall while engaging said rotor and a second position wherein each said pawl projects into said internal chamber for engagement with said rotor, said combustion pawl simultaneously defining said combustion chamber and said compression chamber with said rotor element and said wall when in said second position and said inlet pawl simultaneously defining an intake chamber and an exhaust chamber with said rotor element and said wall when in said second position;

(g) said combustion pawl and said wall forming a valve to seal said means for transporting compression fluid to limit compression fluid flow to said combustion chamber when in said second position, said combustion pawl having a first end pivoted to said external rotor housing and a second end opposite said first end, said second end having a cavity formed therein, said cavity operating to open said valve when aligned with said outlet when said combustion pawl is in said first position, said cavity being transported to within one of said spaces towards said stationary means when said combustion pawl is moved to its said second position;

(h) said seal means being positioned adjacent said housing wall, and comprising a seal element movably mounted within a seal chamber in communication with said combustion chamber, whereby combustion force and rotation of the rotor element within the housing drive the seal means radially away from the shaft and into seal engagement with the wall to provide an effective seal;

(i) said transfer conduit further comprising one-way valves in communication with said inlet and said outlet for regulating flow between said inlet and outlet and said transfer conduit; and, (j) said rotary internal combustion engine further comprising springs positioned within said housing wall for biasing said pawls into engagement with the rotor element engagement surface.

* * * * *